(12) United States Patent
Brüchmann (10) Patent No.: US 11,292,610 B2
(45) Date of Patent: Apr. 5, 2022

(54) CAMERA MODULE AND SYSTEM FOR SURVEILLANCE OF A PASSENGER CABIN OF AN AIRCRAFT, AND AIRCRAFT

(71) Applicant: AIRBUS OPERATIONS GMBH, Hamburg (DE)

(72) Inventor: Gerd Brüchmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 73 days.

(21) Appl. No.: 16/826,433

(22) Filed: Mar. 23, 2020

(65) Prior Publication Data
US 2020/0307825 A1    Oct. 1, 2020

(30) Foreign Application Priority Data

Mar. 28, 2019   (DE) ...................... 10 2019 204 355.0

(51) Int. Cl.
*B64D 45/00*   (2006.01)
*G03B 17/02*   (2021.01)
(Continued)

(52) U.S. Cl.
CPC .......... *B64D 45/0053* (2019.08); *B60Q 3/76* (2017.02); *B64D 47/08* (2013.01); *F21V 5/04* (2013.01);
(Continued)

(58) Field of Classification Search
CPC ........ B64D 47/08; B64D 45/00; B64D 11/00; H04N 5/2252
See application file for complete search history.

(56) References Cited

U.S. PATENT DOCUMENTS 8,249,444 B2 *  8/2012  Peterson ................ G03B 17/55
                                                  396/433
9,395,604 B1 *  7/2016  Fanska ................... F16M 13/02
(Continued)

FOREIGN PATENT DOCUMENTS

DE           38 20 894 A1   12/1989
DE      10 2005 018 316 A1  10/2006
(Continued)

OTHER PUBLICATIONS

German Search Report for Application No. 10 2019 204 355.0 dated Feb. 7, 2020.

*Primary Examiner* — Boubacar Abdou Tchoussou
(74) *Attorney, Agent, or Firm* — Jenkins, Wilson, Taylor & Hunt, P.A.

(57) ABSTRACT

A camera module for surveillance of a passenger cabin of an aircraft, including a covering device for securing in a longitudinal cutout of a service channel including a carrier part having a circular securing cutout and including a mounting structure at least partly surrounding the securing cutout. A camera device includes a camera housing having a mounting portion with a spherically curved outer surface, and includes a camera unit having a lens accommodated in a front cutout of the camera housing, an optical sensor for generating image data, the optical sensor being in an interior of the camera housing, and a data interface for transferring the image data, wherein the camera housing is mounted by the mounting portion in the mounting structure to be rotatable or pivotable about at least two axes, and a locking device for locking the camera housing relative to the mounting structure.

20 Claims, 4 Drawing Sheets

(51) Int. Cl.
  *B64D 47/08* (2006.01)
  *H04N 5/225* (2006.01)
  *B60Q 3/76* (2017.01)
  *F21V 5/04* (2006.01)
  *F21Y 115/10* (2016.01)

(52) U.S. Cl.
  CPC .......... *G03B 17/02* (2013.01); *H04N 5/2253* (2013.01); *F21Y 2115/10* (2016.08)

(56) References Cited

U.S. PATENT DOCUMENTS

| | | | |
|---|---|---|---|
| 10,404,949 B2* | 9/2019 | Lee | H04N 1/00137 |
| 2002/0093564 A1* | 7/2002 | Israel | H04N 7/181 |
| | | | 348/145 |
| 2007/0057785 A1 | 3/2007 | Lee | |
| 2012/0013739 A1* | 1/2012 | Peterson | G08B 13/19628 |
| | | | 348/143 |
| 2014/0192268 A1* | 7/2014 | Petrisor | G06F 3/017 |
| | | | 348/734 |
| 2015/0090839 A1 | 4/2015 | Freund et al. | |
| 2015/0278618 A1* | 10/2015 | Nuscheler | B64D 47/08 |
| | | | 382/104 |
| 2017/0113801 A1* | 4/2017 | Brunaux | B64D 47/08 |
| 2019/0177004 A1* | 6/2019 | Skelly | H04N 5/23216 |
| 2019/0193858 A1 | 6/2019 | Stoeffler et al. | |

FOREIGN PATENT DOCUMENTS

| | | |
|---|---|---|
| DE | 20 2008 002 648 U1 | 7/2008 |
| DE | 20 2017 107 834 U1 | 2/2018 |
| EP | 3 101 474 A1 | 12/2016 |

\* cited by examiner

CAMERA MODULE AND SYSTEM FOR SURVEILLANCE OF A PASSENGER CABIN OF AN AIRCRAFT, AND AIRCRAFT

CROSS-REFERENCE TO RELATED APPLICATION

This application claims priority to German patent application 10 2019 204 355.0 filed Mar. 28, 2019, the entire disclosure of which is incorporated by reference herein.

TECHNICAL FIELD

The disclosure herein relates to a camera module and a system for surveillance of a passenger cabin of an aircraft, and an aircraft, in particular a passenger aircraft.

BACKGROUND

For various reasons, passenger cabins of aircraft are increasingly being equipped with surveillance systems, in particular with camera surveillance systems. For this purpose, cameras are arranged in the passenger cabins, and they record video images of the cabin interior and provide them for reproduction on a display for the cabin personnel.

One challenge in the case of such surveillance systems is posed by the arrangement and supply of the cameras in the passenger cabin. On the one hand, a space-saving, inconspicuous mounting of the cameras is desirable. On the other hand, a good overview of the interior of the passenger cabin is intended to be obtained with the fewest possible cameras. Against this background, DE 20 2017 107 834 U1 describes securing a camera device in a covering device of a service channel, at which a multiplicity of service units, so-called passenger service units (PSU), are additionally arranged. US 2007/0057785 A1 additionally describes wireless data transfer from cameras of a system for surveillance of a passenger cabin to a control device.

It is an object of the disclosure herein to provide an improved concept for surveillance of a passenger cabin of an aircraft.

SUMMARY

This object is achieved by a camera module, a system, and an aircraft as disclosed herein.

According to a first aspect of the disclosure herein, a camera module for surveillance of a passenger cabin of an aircraft is provided. The camera module comprises a covering device for securing in a longitudinal cutout of a service channel comprising a carrier part having a circular securing cutout, and a mounting structure at least partly surrounding the securing cutout, and a camera device. The camera device comprises a camera housing having a mounting portion with a spherically curved outer surface, and a camera unit comprising a lens accommodated in a front cutout of the camera housing, an optical sensor for generating image data, in particular video image data, the optical sensor being arranged in an interior of the camera housing, and a data interface for transferring the image data, wherein the camera housing is mounted by the mounting portion in the mounting structure so as to be rotatable or pivotable about at least two axes. Furthermore, the camera module comprises a locking device for locking the camera housing relative to the mounting structure.

According to a second aspect of the disclosure herein, a system for surveillance of a passenger cabin of an aircraft is provided. The system comprises a service channel extending in a channel longitudinal direction and having a longitudinal cutout running in the channel longitudinal direction, at least one camera module in accordance with the first aspect of the disclosure herein, wherein the carrier part of the camera module is secured in the longitudinal cutout of the service channel, and an image reproduction device connected to the data interface of the camera device via a data network, e.g. a LAN, a WLAN or a Bluetooth network, and configured for reproducing image data provided by the camera device.

According to a third aspect of the disclosure herein, an aircraft is provided. The aircraft comprises a passenger cabin having a multiplicity of rows of passenger seats arranged one behind another in relation to a cabin longitudinal direction, and a system according to the second aspect of the disclosure herein, wherein the service channel is arranged above the rows of passenger seats and extends with the channel longitudinal direction in the cabin longitudinal direction.

One concept underlying the disclosure herein relates to mounting a camera module comprising a camera device for recording video images in a covering device of a service channel so as to be pivotable about at least two axes of rotation, in order to facilitate a flexible orientation of the camera device when the camera module is mounted at the service channel. The video images captured by the camera device are transferred as image data via a data interface to an image reproduction device, e.g. a display, where they can be viewed by the cabin personnel.

The service channel serves as a mounting structure for so-called passenger service units (PSU), that is to say service units for passengers of the aircraft, which have e.g. ventilation outlets of an air-conditioning system, reading lamps, display devices for fasten-seatbelt signs or the like. At the same time, the service channel is used as a line channel for accommodating supply lines of the PSUs. The camera module according to the disclosure herein comprises a covering device comprising a carrier part extending in a planar fashion, e.g. a plate-shaped carrier part, which is able to be inserted into a cutout of the service channel and is able to be secured to the service channel, e.g. by clips or the like. The carrier part has a circular securing cutout or opening. The camera device of the camera module comprises a housing, which defines an interior accommodating a camera sensor and optionally further components of camera electronics. The housing can comprise, in particular, a base portion and a front portion projecting from the latter, wherein a front cutout is formed in the front portion. An optical lens of the camera device is arranged in or at the front cutout of the housing, such that the lens focuses incident light onto the camera sensor. Optionally, provision is made of further lenses or generally a camera optical unit. The housing overall can have a spherical or spherical-cap-shaped outer shape or outer surface. The housing generally comprises a spherically curved mounting portion, which is mounted on a mounting structure secured to the carrier part or formed integrally with the latter. By virtue of the spherical curvature of the mounting portion, the camera device can be pivoted in different spatial directions in a simple manner. The mounting structure extends at least partly around the circumference of the securing cutout. By a locking device, e.g. a clamping screw or the like, the camera housing is fixed in the set pivoting position in a stationary manner relative to the mounting structure and/or to the carrier part.

One of the advantages of the disclosure herein is that by virtue of the pivotable mounting of the camera device, the viewing angle at which video image data can be captured can be flexibly adapted to the respective cabin layout, that is to say to the arrangement of the rows of seats. The covering device enables the camera module to be secured in a service channel. One or a plurality of camera modules can thus be arranged in a distributed manner within a passenger cabin along the service channel. This facilitates surveillance of a large part of the passenger cabin. Furthermore, the electrical supply of the camera module is facilitated by the supply lines usually provided in the service channel.

The at least partly spherical shaping of the camera housing facilitates the pivotable mounting in conjunction with a compact construction of the housing. The camera device can thus be integrated into the covering device in an inconspicuous way.

Advantageous configurations and developments are disclosed herein.

In accordance with one embodiment of the camera module, provision is made for the mounting structure to comprise a base part secured to the carrier part, and a mounting piece guided on the base part along a guide direction running coaxially with respect to a center axis of the securing cutout, wherein the outer surface of the mounting portion of the camera housing bears against a bearing portion of the base part with a first region and against the mounting piece with an opposite region in relation to the guide direction, and wherein the camera housing is locked with frictional engagement between the mounting piece and the bearing portion of the base part by the locking device. Accordingly, the mounting structure forms a bipartite shell of a ball-and-socket joint, wherein the mounting portion of the camera housing is guided between the bearing portion of the base part, which forms a first half-shell of the joint, and the mounting piece, which forms a second half-shell of the joint. The locking device pretensions the mounting piece in the direction of the bearing portion, as a result of which the bearing portion of the camera housing is clamped in between mounting piece and bearing portion of the base part. A structurally simple pivotable mounting and locking of the camera housing is thus achieved.

In accordance with a further embodiment, the locking device is formed by a retaining ring that pretensions the mounting piece in the direction of the bearing portion of the base part and is secured to the base part in a releasable manner. By way of example, the retaining ring can have an external thread, which is screwed together with an internal thread provided on the base part in order to apply the pretensioning. The retaining ring can optionally be formed integrally with the mounting piece, e.g. by the mounting piece having an external thread, such that the latter is able to be screwed into the base part. Moreover, it is conceivable for the retaining ring, irrespective of whether the latter is formed by the mounting piece itself or is realized as a separate component part, to be pretensioned by springs in the direction of the bearing portion of the base part. These design possibilities provide in each case structurally simple solutions for the pivotable mounting and locking of the camera housing.

In accordance with a further embodiment, provision is made for the data interface to be configured for wireless data transfer, e.g. as a WIFI interface, as a Bluetooth interface or the like. The wireless data transfer reduces the cabling outlay in the service channel and at the same time makes possible a high data transfer rate to different receivers, such that the video image data can be distributed flexibly to one or more image reproduction devices.

In accordance with a further embodiment, the camera device comprises an evaluation unit for evaluating the image data, the evaluation unit being connected to the sensor and the data interface, wherein the evaluation unit is configured to recognize predetermined image patterns in the image data, and to enable the transfer of the image data by the data interface only if a predetermined image pattern is recognized. The evaluation unit can comprise in particular a processor and a data memory readable by the processor and be realized as a microprocessor, for example. The evaluation unit is configured for implementing an image processing algorithm, which can be stored e.g. as software on the data memory. The image processing algorithm evaluates the image data provided by the camera sensor to the effect of whether specific movement patterns are present. A movement pattern can be defined in the simplest case e.g. by a predetermined image region being concealed by an object, e.g. because a passenger moves away from his/her seat or stands up. A type of motion sensor can thus be integrated into the camera device in a simple manner, the motion sensor being adaptable to the respective installation conditions of the camera module particularly flexibly in terms of software technology. The evaluation unit enables the data transfer via the data interface only if a predetermined movement pattern is recognized, e.g. by the evaluation unit itself providing the image data at the data interface. The amount of data actually transferred can be significantly reduced as a result. In addition, the surveillance effort for the cabin personnel is advantageously reduced since images are displayed on the image reproduction device only if a relevant movement, e.g. a passenger standing up during a critical phase of a flight, such as take off and landing, is actually detected.

Optionally, the sensor of the camera device can be embodied as a photomixing detector, that is to say as a PMD sensor, which is configured for emitting light pulses and for determining the light signal time of flight. A so-called ToF camera can thus be realized, wherein "ToF" is an abbreviation of the English expression "Time of Flight". This further facilitates the identification of motion.

In accordance with one embodiment of the camera module, provision is made for the camera device to comprise a motion sensor for detecting movements in the field of view of the camera sensor, and an evaluation unit, wherein the motion sensor is connected to the evaluation unit and the evaluation unit is configured to enable the transfer of the image data by the data interface only if a movement is detected by the motion sensor. The evaluation unit can be realized as described above, for example, as a microprocessor or the like or as an analogue switching device that activates or switches off the data interface. The motion sensor can be integrated into the front cutout of the camera housing and be realized e.g. as a radar sensor, an infrared sensor or a similar sensor.

Optionally, the evaluation unit can be configured to convert the image data into image information data and to provide the latter at the data interface. This can be done as an alternative or in addition to providing the image data. The image information data can contain binary state information about a state of one or more cabin components. By way of example, state information regarding a pivoting position of a tray table arranged on a passenger seat (opened out or stowed), a closing state of a seatbelt (open or closed) and/or an occupancy state of a passenger seat (empty or occupied) can be determined from the image data, for example on the basis of the motion data detected by the motion sensor or on the basis of the image data captured by the camera. As a result of the transfer of the image information data, information about the states of cabin components that is comprehensible to the cabin personnel simply and rapidly is provided abstractly by the actual visual image contained in the image data.

In principle, it is also conceivable to integrate further sensors into the camera housing, e.g. temperature sensors, air pressure sensors, moisture sensors and the like. The sensor signals provided by the sensors can be fed into a data network via the data interface.

In accordance with a further embodiment of the camera module, provision is made for the camera device to comprise an illuminant arranged at a front portion of the camera housing. In particular, the illuminant can be arranged together with the lens in the front cutout of the camera housing. By way of example a light-emitting diode, LED for short, can be used as the illuminant. Thus, firstly, the scene to be captured can be illuminated, as a result of which the image quality is improved. Optionally, the illuminant can also be used by passengers as a reading lamp, such that the functional integration within the passenger cabin is improved further.

Optionally, the illuminant is configured for emitting visible light and/or light in the infrared range. In particular, when light in the infrared range is emitted, the scene to be captured by the camera device can be illuminated without adversely affecting the passengers, which is advantageous particularly when the cabin is in darkness.

In accordance with one embodiment of the system for surveillance of the passenger cabin, provision is made for the image reproduction device to be realized as a personal electronic device, e.g. as a tablet PC, as a smartphone or the like. The image reproduction device generally comprises a display and a data interface for receiving (video) image data. As a personal electronic device, the image reproduction device can be carried by the cabin personnel, such that the images recorded by the camera device are retrievable practically wherever the cabin personnel are located.

In accordance with a further embodiment, the image reproduction device can be realized by a display arranged in a stationary fashion relative to the service channel. The display can be fitted e.g. to an on-board monument, such as e.g. an on-board galley or an on-board toilet. In particular, the display can be formed by a display of the so-called flight attendant panel, as part of the so-called cabin management system (CMS), which is provided as an operating and display interface for operating and for displaying various functions of the PSUs. This affords the advantage that, besides the customary cabin functions, the passenger cabin surveillance function realized by the camera modules is also provided by one and the same image reproduction device.

In accordance with one embodiment of the aircraft, the latter comprises a flight attendant seat arranged in the passenger cabin and, arranged opposite the flight attendant seat, a cabin monument, such as e.g. an on-board galley, an on-board toilet or a partition, to which the image reproduction device is fitted, in particular fitted in a releasable manner. By way of example, the image reproduction device realized as a personal electronic device can be secured in a mount provided on the on-board monument, e.g. by a releasable clip or the like. During take off and landing, a member of the cabin crew can sit down on the flight attendant seat and monitor the cabin region by virtue of the images recorded by the camera device being displayed on the image reproduction device. A flexible arrangement of the flight attendant seat within the passenger cabin is thus possible since the cabin crew need no longer have a direct view of the rows of seats.

With regard to direction indications and axes, in particular direction indications and axes which relate to the course of physical structures, a course of one axis, of one direction or of one structure "along" another axis, direction or structure is understood herein to mean that these, in particular the tangents arising at a respective point of the structures, run in each case at an angle of less than 45 degrees, preferably less than 30 degrees, and particularly preferably parallel to one another.

With regard to direction indications and axes, in particular direction indications and axes which relate to the course of physical structures, a course of one axis, of one direction or of one structure "transversely" to another axis, direction or structure is understood herein to mean that these, in particular the tangents arising at a respective point of the structures, run in each case at an angle of greater than or equal to 45 degrees, preferably greater than or equal to 60 degrees and particularly preferably perpendicularly to one another.

Components formed "in one piece", "in one part", "integrally" or "as one piece" is generally understood herein to mean that these components are present as a single part forming a material unit and in particular are produced as such, wherein one component is not releasable from the other component without elimination of the material cohesion from the other component.

BRIEF DESCRIPTION OF THE DRAWINGS

The disclosure herein is explained below with reference to the figures of the drawings. In the figures.

In the figures, the same reference signs designate identical or functionally identical components, unless something to the contrary is indicated.

DETAILED DESCRIPTION

Figure 1:
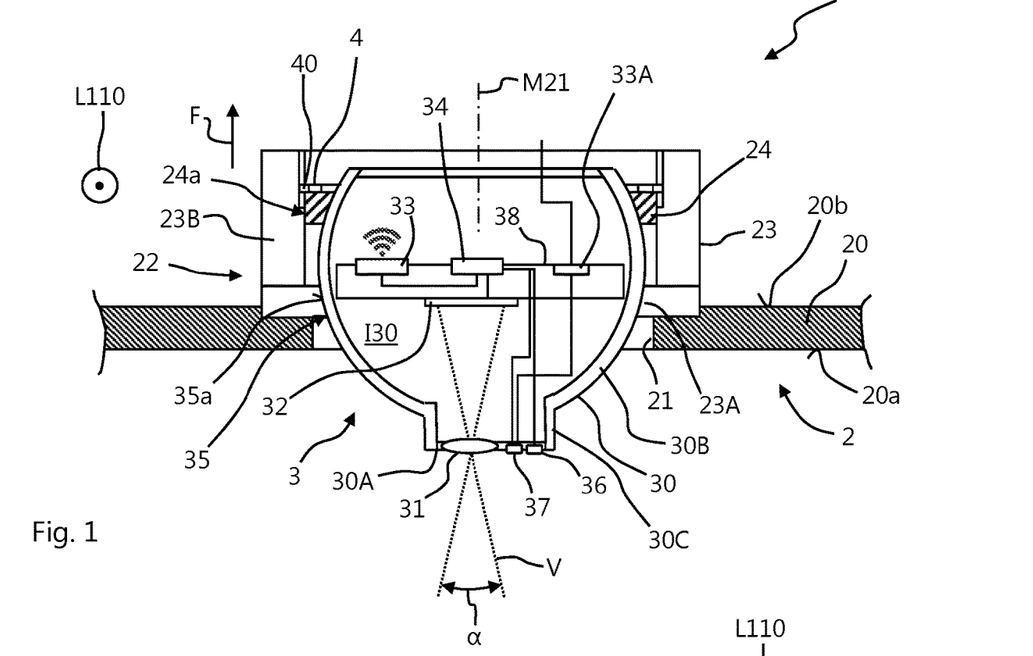
FIG. 1 shows a schematic sectional view of a camera module in accordance with one exemplary embodiment of the disclosure herein.
Figure 2:
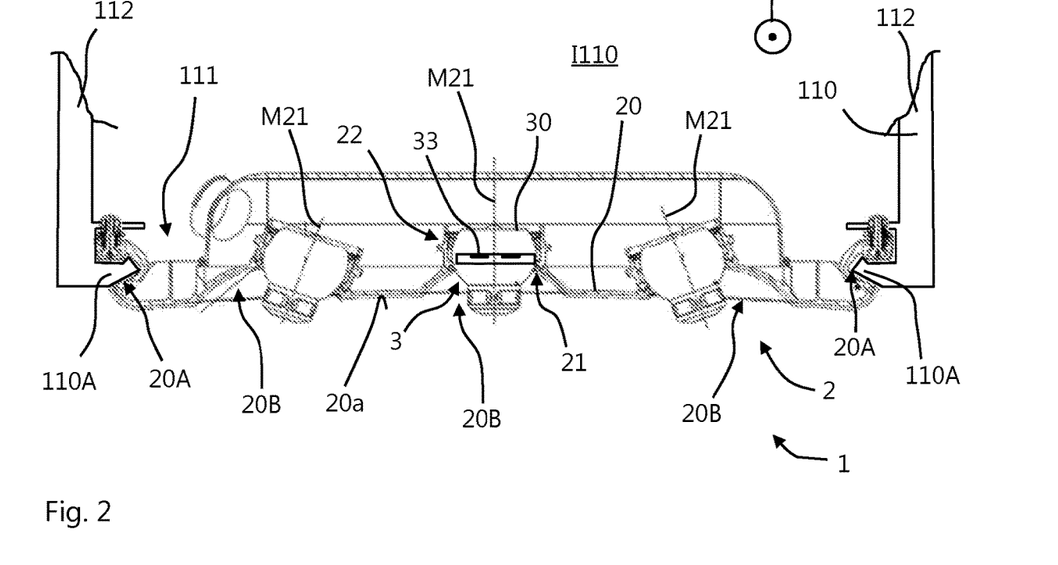
FIG. 2 shows a schematic sectional view of a camera module mounted in a service channel in accordance with one exemplary embodiment of the disclosure herein.
Figure 3:
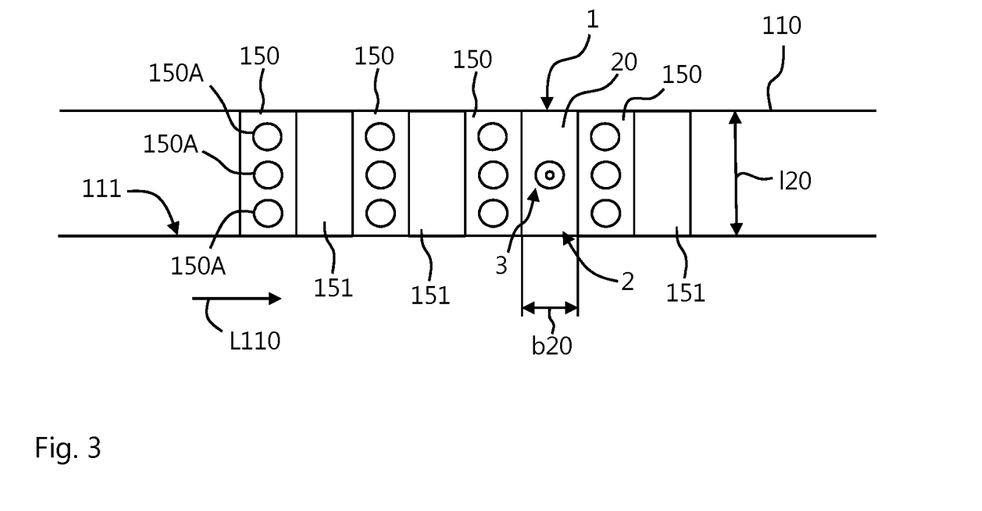
FIG. 3 shows a schematic plan view of a longitudinal opening of a service channel in which a camera module in accordance with one exemplary embodiment of the disclosure herein and further service modules (PSUs) are mounted.
Figure 5:
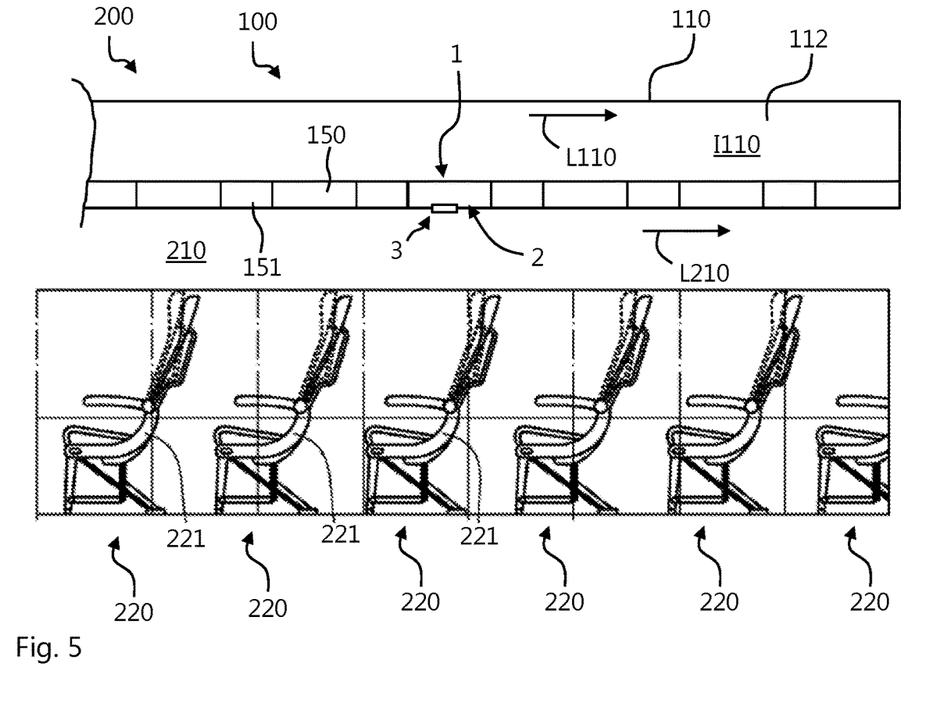
FIG. 5 shows a schematic sectional view of a passenger cabin of an aircraft in accordance with one exemplary embodiment of the disclosure herein.

FIG. 1 shows a sectional view of a camera module 1 by way of example and purely schematically. The camera module 1 serves for surveillance of a passenger cabin 210 of an aircraft 200 and can be mounted at a service channel 110 in the passenger cabin 210, as is illustrated e.g. in FIG. 2. FIGS. 3 and 5 show an arrangement of the camera module 1 at the service channel 110 together with optional service modules, so-called passenger service units (PSUs) 150, and likewise optional dummy modules 151.

As is illustrated by way of example in FIG. 1, the camera module 1 comprises a covering device 2, a camera device 3, and a locking device 4.

The covering device 2 comprises a carrier part 20 and a mounting structure 22 for mounting or receiving the camera device 3. The carrier part 20 can be realized in particular as a component part extending in a planar fashion, e.g. as a plate-shaped component part as illustrated by way of example in FIGS. 1 and 2. The carrier part 20 can comprise a securing structure 20A in each case at opposite lateral end portions, as is illustrated by way of example in FIG. 2. As is discernible in FIG. 2, the securing structure 20A can be formed by a receiving groove, for example, into which a corresponding securing structure 110A of the service channel 110 is able to be inserted. As is furthermore illustrated in FIG. 1, the carrier part 20 has a securing cutout 21, which can be embodied in a circular fashion, in particular, and extends between a first surface 20a and a second surface 20b—located opposite the latter—of the carrier part 20. As is discernible in FIG. 2, the carrier part 20 can have one or more curved regions 20B in which the first surface 20a forms a concavely curved depression. The securing cutout 21 is optionally formed in a respective curved region 20B, as is illustrated by way of example in FIG. 2. The carrier part 20 can have a length 120 in a range of between 20 cm and 100 cm and a width b20 in a range of between 8 cm and 20 cm. The carrier part 20 can be formed in particular from a plastics material or a fibre composite material.

The mounting structure 22 serves for the pivotable mounting of the camera device 3 and can comprise in particular a base part 23 and optionally a mounting part 24. The base part 23 is secured to the carrier part 20, e.g. screwed thereto, adhesively bonded thereto or formed integrally therewith, and is arranged on the second surface 20b of the carrier part, as is illustrated by way of example in FIG. 1. The base part 23 can be realized for example as a cylindrical or parallelepipedal component part and comprises a bearing portion 23A projecting into the securing cutout 21 of the carrier part 20, the bearing portion having a bearing surface for bearing against the camera device 3. Furthermore, the base part 23 comprises a guide portion 23B extending transversely with respect to the bearing portion 23A. Generally, the mounting structure 22 at least partly surrounds the securing cutout 21.

The guide portion 23B defines a guide surface that at least partly encloses a center axis M21 of the securing cutout 21 and extends parallel to the center axis M21 of the securing cutout 21 in a guide direction F. In particular, the guide surface of the guide portion 23B defines a guide axis running coaxially with respect to the center axis M21 of the securing cutout 21. As is shown by way of example in FIG. 1, the optional mounting part 24 can be mounted with an outer circumferential surface 24a in a manner displaceable along the guide direction F on the guide surface of the guide portion 23B.

As is illustrated by way of example in FIG. 1, the camera device 3 comprises a camera housing 30 and a camera unit comprising a lens 31, an optical sensor or camera sensor 32 and a data interface 33. Optionally, the camera unit can additionally comprise a motion sensor 36, e.g. in the form of a radar or infrared sensor, and/or an illuminant 37, e.g. in the form of an LED.

As is illustrated by way of example in FIG. 1, the camera housing 30 can comprise a spherical-cap-shaped base portion 30B and a, for example cylindrical, front portion 30C projecting radially from the base portion. Generally, the camera housing 30 defines an interior I30 and has a front cutout or front opening 30A. Furthermore, the camera housing 30 comprises a mounting portion 35 having a spherically curved outer surface 35A. The spherically curved outer surface 35A forming the mounting portion 35 can be formed for example directly by the outer surface of the base portion 30B of the camera housing 30, as is shown by way of example in FIG. 1. Alternatively, it is also conceivable for the base portion 30B of the camera housing 30 to have a parallelepipedal or other shape and for the mounting portion 35 in the form of a spherical cap to be integrally formed on the base portion 30B of the camera housing 30 or to be secured thereto. FIG. 1 illustrates by way of example that the front cutout 30A is formed at an end face of the front portion 30C. Alternatively, it is also conceivable for the front cutout 30A to be formed at a circumferential surface of the front portion 30C connecting the end side to the base portion 30B, as is illustrated by way of example in FIG. 7. The camera housing 30 can be formed from a plastics material, in particular.

As is illustrated by way of example in FIG. 1, the camera housing 30, with a first region of the mounting portion 35 or the spherically curved outer surface 35a, bears against the base portion 23A of the base part 23 of the mounting structure 22 or is guided on the base portion 23A. By virtue of the spherical curvature of the outer surface 35a of the mounting portion 35 of the camera housing 30, the camera housing 30 can be rotated or pivoted about at least two pivoting axes, such that the front opening 30A can be oriented flexibly in different directions.

Optionally, the camera housing 30 can bear against the mounting piece 24 with a second region of the mounting portion 35 or the spherically curved outer surface 35a, wherein the second region of the mounting portion 35 is opposite to the first region in relation to the guide direction F. The locking device 4, which is embodied by way of example in the form of a retaining ring in FIG. 1, the retaining ring being screwed by an external thread 40 into an internal thread provided on the guide portion 23B, pretensions the mounting piece 24 along the guide direction F or in the direction of the bearing portion 23A of the base part 23. The camera housing 30 is thus locked with frictional engagement between the mounting piece 24 and the bearing portion 23A of the base part 23. It goes without saying that other types of locking devices 4 which pretension the mounting piece 24 in the direction of the bearing portion 23A of the base part 23 and secure it to the base part 23 in a releasable manner are also conceivable, such as e.g. springs or retaining pins acting on the mounting piece 24 or directly on the housing 30.

The camera unit illustrated by way of example in FIG. 1 comprises a lens 31, an optical camera sensor 32, a data interface 33, an optional evaluation unit 34, an optional motion sensor 36 and a likewise optional illuminant 37. The lens 31 or generally an optical lens arrangement is arranged in the front cutout 30A of the camera housing 30, e.g. by a carrier (not illustrated) or by the lens 31 being fitted into the front cutout 30A.

The optical sensor 32 is arranged opposite the lens 31 in the interior I30 of the camera housing 30. In the case of the camera module 1 illustrated by way of example in FIG. 1, the optical sensor 32 is arranged in the region of the base portion 30B of the camera housing 30. In the camera module 1 illustrated by way of example in FIG. 7, the optical sensor 32 is arranged in the region of the front portion 30C. Generally, the sensor 32 can be arranged and contacted on a printed circuit board 38, as is illustrated schematically in FIG. 1. The optical sensor can be for example a CCD sensor, a CMOS sensor or a PMD sensor and is configured for generating image data on the basis of light in the visible range through to the infrared range, wherein the light is directed or focused onto the sensor 32 by the lens 31. A field of view V of the camera device is defined by the arrangement of lens 31 and sensor 32 relative to one another and by the optical properties of the lens 31. By way of example, an aperture angle α of the field of view V can be up to 185 degrees, preferably between 180 degrees and 60 degrees.

The data interface 33 is configured for wired or preferably for wireless data transfer. By way of example, the data interface 33 can be realized as a WLAN antenna or as a Bluetooth interface. FIG. 1 illustrates by way of example that the data interface 33 is likewise provided on the printed circuit board 38. It goes without saying that the data interface 33 can also be provided separately from the printed circuit board 38 on which the camera sensor 32 is arranged, or totally separately from a printed circuit board. The camera sensor 32 is connected to the data interface 33, such that the image data generated by the camera sensor 32 can be provided at the data interface 33 and can be transferred by the latter via a data network.

The camera unit furthermore comprises an electrical supply terminal 33A for connection to an electrical voltage source S, aircraft-typically e.g. an 115 V AC voltage at 400 Hz or a 28V DC voltage. FIG. 1 illustrates by way of example that the supply terminal 33A is formed on the same printed circuit board 38 on which the camera sensor 38 is arranged. It goes without saying that the supply terminal 33A can also be provided on a separate printed circuit board (not illustrated) that is contacted with the printed circuit board 38 illustrated in FIG. 1. All components of the camera unit are able to be supplied with electrical energy via the supply terminal 33A.

The optional evaluation unit 34 can comprise in particular a processor, e.g. in the form of a CPU, an FPGA, an ASIC or the like, and a memory readable by the processor, e.g. in the form of a Flash memory or some other non-volatile data memory medium. The evaluation unit 34 is connected to the optical sensor 32 and the data interface 33. Software that is executable by the processor can be stored in the memory. By way of example, the software can contain image recognition algorithms that allow detection of predetermined movement patterns in the image data. By way of example, a plurality of image data sets recorded successively in time can be compared in order to ascertain changes indicating motion in the field of view of the camera unit. Moreover, a time of flight evaluation of light pulses can be carried out, for example, if the optical sensor 32 is embodied as a PMD sensor.

The evaluation unit can be configured for example to convert the image data into image information data and to provide the latter, as an alternative or in addition to the image data representing a visual scene in the field of view V of the camera unit, at the data interface. The image information data contain binary state information about a state of one or more cabin components, such as, for example, regarding a pivoting position of a tray table arranged on a passenger seat, a closing state of a seat belt and/or an occupancy state of a passenger seat. These image information data are detectable on the basis of the image data by the image recognition algorithm, for example. By way of example, for this purpose, image data representing specific image regions can be analyzed for the presence of features indicating the state of the respective cabin component. The image information data representing the state of a respective cabin component can preferably indicate just two states, e.g. "folded back" or "opened out" with regard to a tray table or "occupied" or "free" with regard to a passenger seat.

Alternatively or additionally, the evaluation unit 34 can also be connected to the optional motion sensor 36. The motion sensor 36 can be realized as a radar sensor or in a similar way and is configured to detect movements in the field of view of the optical sensor 32. In this way, a seat occupancy can likewise be registered, e.g. by virtue of the fact that, upon detection of motion, e.g. on the basis of time of flight evaluation of radiation emitted by the motion sensor 36, the state "occupied" is determined by the evaluation unit 34 and is provided as a corresponding image information data set at the data interface 33.

The evaluation unit 34 can be configured in particular to enable the transfer of the image data by the data interface 33 only if a predetermined movement pattern is recognized in the image data or motion is detected by the motion sensor 36.

The optional illuminant 37 serves for illuminating the field of view of the camera device and/or generally as a light source. The illuminant 37 can be arranged together with the lens 31 in the front cutout 30A of the camera housing 30, as is illustrated by way of example in FIG. 1. As is additionally discernible in FIG. 1, the illuminant 37 can be connected to the evaluation unit 34, which can also be configured to drive the illuminant 37 or to switch the latter on or off, in particular on the basis of a control command received via the data interface 33. The illuminant 37 can be configured for emitting visible light and/or light in the infrared range and is preferably realized as an LED.

Figure 7:
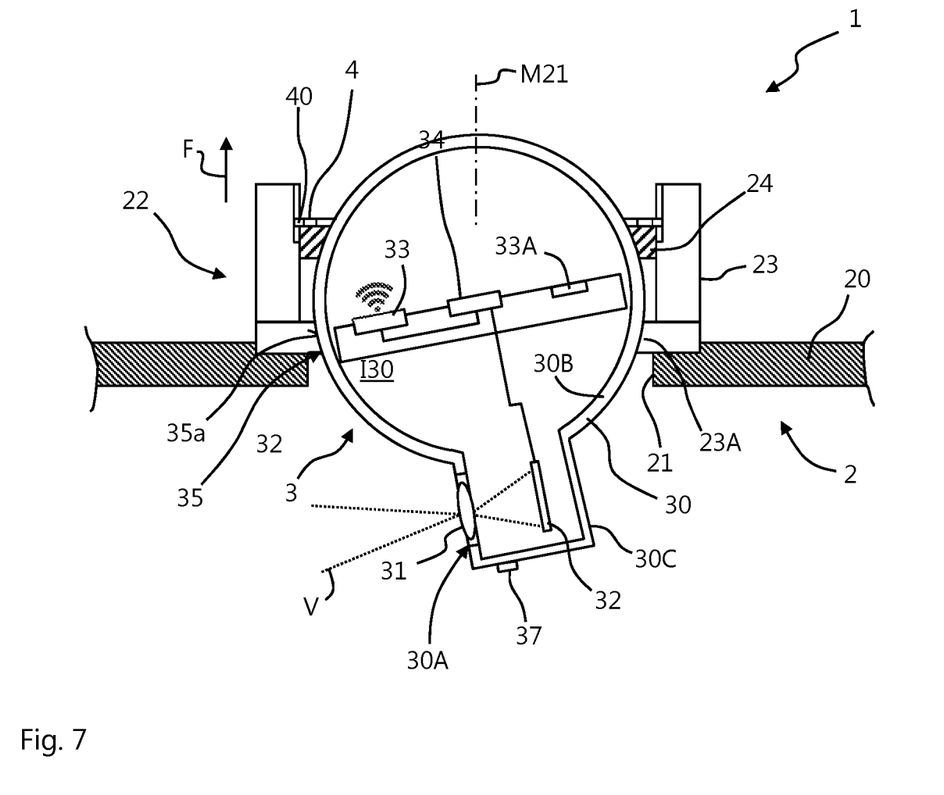
FIG. 7 shows a schematic sectional view of a camera module in accordance with a further exemplary embodiment of the disclosure herein.

FIG. 7 shows a further camera module 1, which differs from the camera module in FIG. 1 in particular in the design of the front portion 30C of the camera housing 30. As already explained above, in the case of the camera module 1 illustrated by way of example in FIG. 7, the front cutout 30A is formed in a circumferential surface of the front portion 30C that extends radially with respect to the base portion 30B and transversely with respect to the end face of the front portion 30C. As illustrated in FIG. 7, the lens 31 is arranged in the front cutout 30A and the camera sensor 32 is arranged opposite the lens 31 in the front portion 30C and thus in the interior I30 of the camera housing 30. The optional motion sensor 36 illustrated by way of example in FIG. 1 is not depicted in FIG. 7, but can be provided, of course. As is furthermore discernible in FIG. 7, the optional illuminant 37 can be provided at the end face of the front portion 30C.

The camera module 1 explained with reference to exemplary FIGS. 1 and 7 can be used in particular in a system 100 for surveillance of a passenger cabin 210 of an aircraft 200. In this case, the camera module 1 is inserted into a service channel 110, as is illustrated by way of example in a sectional view transversely with respect to the service channel 110 in FIG. 2, in a sectional view along the service channel 110 in FIG. 4 and in a plan view of the service channel 110 in FIG. 3.

The service channel 110 comprises channel walls 112 extending in a channel longitudinal direction L110 and defining a channel interior I110 and a channel longitudinal opening or cutout 111 extending in the channel longitudinal direction L110. As is illustrated schematically in FIG. 2, the camera module 1 is secured by the carrier part 20 in the longitudinal cutout 111, e.g. by the securing structures 20A formed on the carrier part 20.

As is illustrated by way of example in FIGS. 3 and 5, further functional modules, in particular so-called PSUs 150 and dummy modules 151, can additionally be arranged in the service channel 110. The PSUs 150 can comprise for example so-called air showers, i.e. air outlets of an air-conditioning system, reading lamps, luminous displays or other functional units 150A, which are represented merely symbolically as circles in FIG. 3. The dummy modules 151 can be substantially plate-shaped covers secured as a screen in the longitudinal cutout 111 of the service channel 110. One camera module 1 and a plurality of PSUs 150 and dummy modules 151 are illustrated by way of example in FIG. 3. It goes without saying that a plurality of camera modules 1 can also be provided in the service channel 110.

Figure 4:
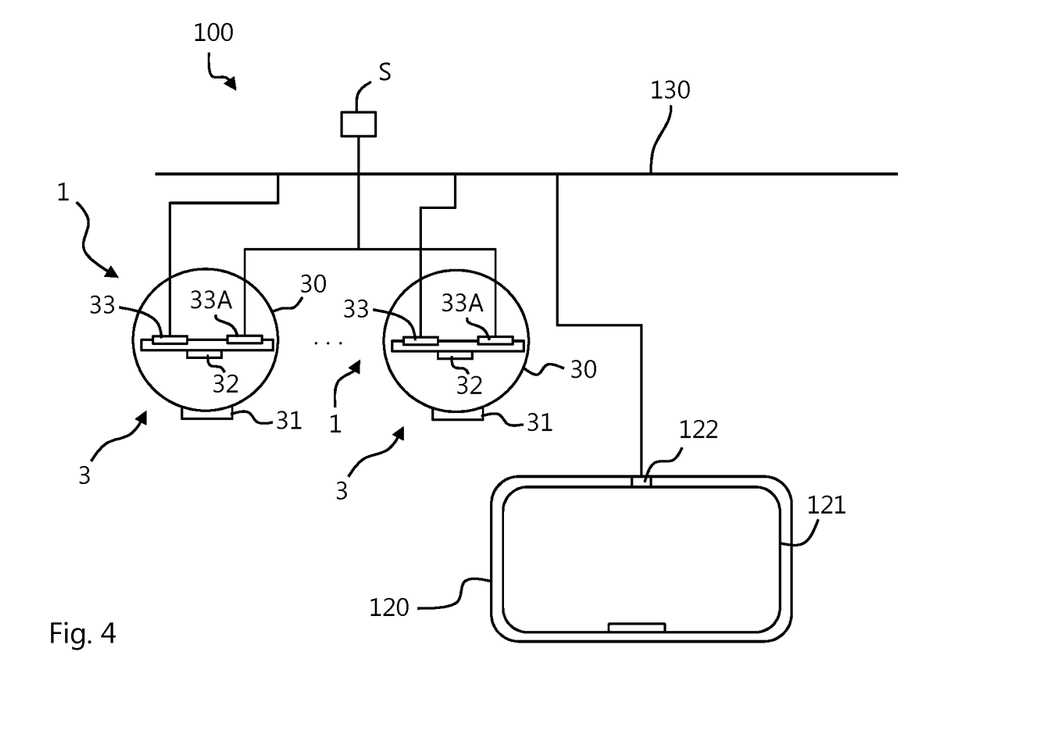
FIG. 4 shows a schematically functional illustration of a system for surveillance of a passenger cabin of an aircraft in accordance with one exemplary embodiment of the disclosure herein.

FIG. 4 shows by way of example a functional architecture of the system 100. As illustrated by way of example in FIG. 4, the system 100 comprises one or a plurality of camera modules 1 and an image reproduction device 120. The service channel 110 and the covering device 2 of the camera module 1 have been omitted in FIG. 4 for reasons of clarity.

The image reproduction device 120 can be realized in particular as a portable personal electronic device, for example as a tablet PC, as is illustrated schematically in FIG. 4. Alternatively, it is also conceivable to provide a stationary display as the image reproduction device 120. By way of example, in an aircraft 200, the display can be fitted to an on-board monument and can optionally be formed by a so-called flight attendant panel. From the flight attendant panel, for example as part of the cabin management system (CMS), various cabin functions, such as e.g. the functional units 150A of the PSUs 150, can be controlled. Generally, the image reproduction device 120 is configured for displaying graphical representations and can comprise in particular a display 121 such as, for example, an LED, OLED, TFT or LCD screen or the like, with or without backlighting. The image reproduction device 120 can comprise a data interface 122 configured for wired or wireless data transfer. By way of example, the data interface 122 of the image reproduction device 120 can be realized as a WLAN or Bluetooth interface.

As is illustrated symbolically in FIG. 4, each camera unit of the camera modules 1 is connected via the respective supply terminal 33A thereof to an electrical voltage source S, e.g. via lines (not illustrated) running in the service channel 110. The camera modules 1 are each connected via the data interface 33 to a data network 130 and via the latter to the image reproduction device 120, wherein the image reproduction device 120 is connected by its data interface 122 to the same data network 130.

Image data generated by the camera sensor 32 can thus be provided at the data interface 33 of the camera device 3 and be distributed via the data network 130. The image reproduction device 120 acquires the image data at its data interface 122 from the data network 130 and can display a scene recorded by the camera device 3 on the basis of the image data.

Figure 6:
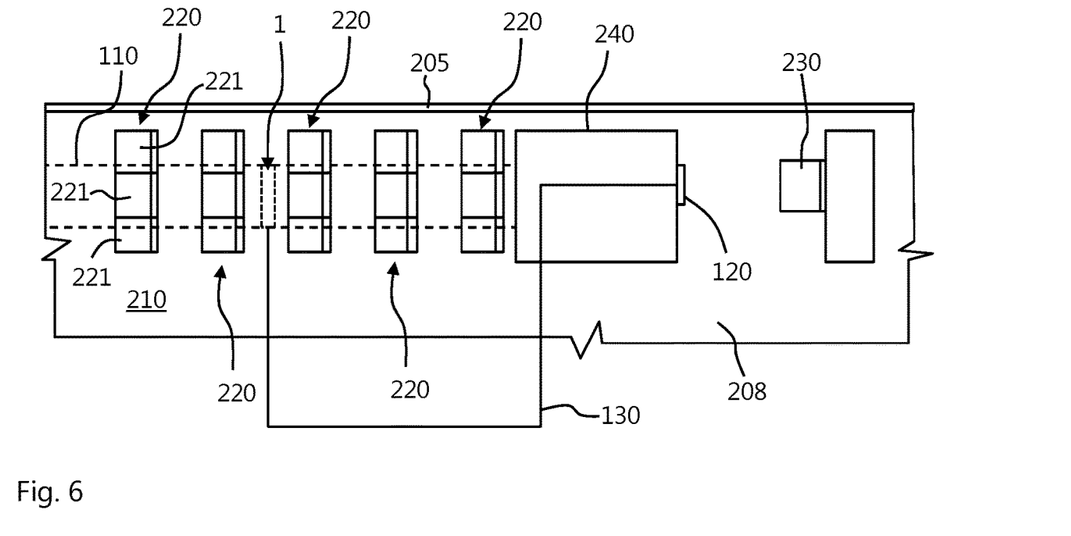
FIG. 6 shows a plan view of a passenger cabin of an aircraft in accordance with a further exemplary embodiment of the disclosure herein.

FIGS. 5 and 6 each illustrate by way of example an interior view of a passenger cabin 210 of an aircraft 200 comprising the surveillance system 100 described. The passenger cabin 210 is delimited by a fuselage 205 extending in a cabin longitudinal direction L210 and a cabin floor 208 extending in the cabin longitudinal direction L210. A multiplicity of rows 220 of passenger seats comprising in each case one or more passenger seats 221 arranged next to one another are secured on the cabin floor 208. The rows 220 of passenger seats are arranged one behind another or successively in relation to the cabin longitudinal direction L210. As is illustrated schematically in FIG. 5, the service channel 110 is arranged above the rows 220 of passenger seats in relation to the cabin floor 208 and can be secured to the fuselage 205, for example. In this case, the service channel 110 extends with the channel longitudinal direction L110 along the cabin longitudinal direction L210 and the longitudinal cutout 111 with the at least one camera module 1 secured therein is oriented in a manner facing the rows 220 of passenger seats or the cabin floor 208.

As shown by way of example in FIG. 6, optionally one or more on-board or cabin monuments 240, e.g. in the form of on-board galleys, on-board toilets or partitions, can additionally be provided in the passenger cabin 210. Optionally, a flight attendant seat 230 can additionally be provided, which serves as safe seating in particular for the flight attendants in particular during take-off and landing. As is shown by way of example in FIG. 6, the flight attendant seat 230 can be arranged opposite the cabin monument 240. By way of example, as illustrated schematically in FIG. 6, the image reproduction device 120 can be fitted, in particular secured in a releasable manner, to the cabin monument 240.

As depicted schematically in FIG. 6, a surveillance video can be recorded by the camera device 3 of the camera module 1 in the passenger cabin, wherein the image data generated by the camera sensor 32 are fed into the data network 30 via the data interface 33. Via the data interface 122, the image reproduction device 120 acquires the image data from the data network 130 and can reproduce the surveillance video represented by the image data on the display 121.

Although the disclosure herein has been explained by way of example above on the basis of exemplary embodiments, it is not restricted thereto, but rather is modifiable in diverse ways. In particular, combinations of the exemplary embodiments above are also conceivable.

The subject matter disclosed herein can be implemented in software in combination with hardware and/or firmware. For example, the subject matter described herein can be implemented in software executed by a processor or processing unit. In one example implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Camera module
2 Covering device
3 Camera device
4 Locking device
20 Carrier part
20A Securing structure of the carrier part
21 Securing cutout
22 Mounting structure
23 Base part
23A Bearing portion
23B Guide portion
24 Mounting piece
24a Outer circumferential surface of the mounting piece
30 Camera housing
30A Front cutout
30B Base portion of the camera housing
30C Front portion
31 Lens
32 Optical camera sensor
33 Data interface
33A Supply terminal
34 Evaluation unit
35 Mounting portion
35a Outer surface of the mounting portion
36 Motion sensor
37 Illuminant
38 Printed circuit board
40 External thread
100 System
110 Service channel
110A Securing structure of the service channel
111 Longitudinal cutout
112 Channel walls
120 Image reproduction device
121 Display
122 Data interface of the image reproduction device
130 Data network
150 PSUs
150A Functional units
151 Dummy modules
200 Aircraft
205 Fuselage
208 Cabin floor
210 Passenger cabin
220 Rows of passenger seats
221 Passenger seats
230 Flight attendant seat
240 Cabin monument
I30 Interior of the camera housing
L110 Channel longitudinal direction
L210 Cabin longitudinal direction
M21 Center axis of the securing cutout
S Voltage source

The invention claimed is:

1. A camera module for surveillance of a passenger cabin of an aircraft, the camera module comprising:
a covering device for securing in a longitudinal cutout of a service channel, the covering device comprising:
a carrier part having a circular securing cutout; and
a mounting structure, which at least partly surrounds the securing cutout and comprises a base part secured to the carrier part;
a camera device comprising:
a camera housing comprising:
a mounting portion with a spherically curved outer surface; and
a front cutout;
wherein the camera housing is mounted by the mounting portion within the mounting structure for rotation or pivoting about at least two axes:
wherein the outer surface of the mounting portion of the camera housing bears against a bearing portion of the base part with a first region; and
a camera unit comprising:
a lens accommodated in the front cutout of the camera housing;
an optical sensor located in an interior of the camera housing, wherein the optical sensor is configured for generating image data; and
a data interface for transferring the image data; and
a locking device, which is configured for locking the camera housing relative to the mounting structure due to frictional engagement of the camera housing with the bearing portion.

2. The camera module according to claim 1, wherein the mounting structure comprises a mounting piece guided on the base part along a guide direction that is coaxial with respect to a center axis of the securing cutout, wherein the outer surface of the mounting portion of the camera housing bears against the mounting piece with an opposite region in relation to the guide direction, and wherein the camera housing is locked with frictional engagement between the mounting piece and the outer surface of the mounting portion by the locking device.

3. The camera module according to claim 2, wherein the locking device is formed by a retaining ring that pretensions the mounting piece in a direction of the bearing portion of the base part and is secured to the base part in a releasable manner.

4. The camera module according to claim 2, wherein the locking device is formed by a retaining ring that pretensions the mounting piece in a direction of the bearing portion of the base part and comprises an external thread, by which the retaining ring is secured to the base part in a releasable manner.

5. The camera module according to claim 1, wherein the data interface is configured for wireless data transfer.

6. The camera module according to claim 5, wherein the data interface is configured for wireless data transfer comprising a WIFI interface or a Bluetooth interface.

7. The camera module according to claim 1, wherein the camera device comprises a processor, which is connected to the optical sensor and the data interface and is configured to evaluate the image data by recognizing predetermined image patterns in the image data and to enable transfer of the image data by the data interface only when one of the predetermined image patterns is recognized.

8. The camera module according to claim 7, wherein the processor is configured to convert the image data into image information data and to provide the image information data, optionally instead of the image data, at the data interface, and wherein the image information data contain binary state information about a state of one or more cabin components.

9. The camera module according to claim 1, wherein the camera device comprises a motion sensor, which is configured for detecting movements in a field of view of the optical sensor, and a processor, wherein the motion sensor is connected to the processor, and wherein the processor is configured to enable transfer of the image data by the data interface only when a movement is detected by the motion sensor.

10. The camera module according to claim 1, wherein the camera device comprises an illuminant on a front portion of the camera housing.

11. The camera module according to claim 10, wherein the illuminant is configured for emitting visible light and/or light in an infrared range.

12. A system for surveillance of a passenger cabin of an aircraft, the system comprising:
   a service channel, which extends in a channel longitudinal direction and comprises a longitudinal cutout that extends in the channel longitudinal direction;
   at least one camera module comprising:
      a covering device comprising:
         a carrier part having a circular securing cutout; and
         a mounting structure at least partly surrounding the securing cutout;
      a camera device comprising:
         a camera housing comprising:
            a mounting portion with a spherically curved outer surface; and
            a front cutout;
            wherein the camera housing is mounted by the mounting portion within the mounting structure for rotation or pivoting about at least two axes; and
         a camera unit comprising:
            a lens accommodated in the front cutout of the camera housing;
            an optical sensor located in an interior of the camera housing, wherein the optical sensor is configured for generating image data; and
            a data interface for transferring the image data; and
      a locking device, which is configured for locking the camera housing relative to the mounting structure;
      wherein the carrier part of the camera module is secured in the longitudinal cutout of the service channel; and
   an image reproduction device, which is connected to the data interface of the camera device via a data network and is configured for reproducing image data provided to the image reproduction device by the camera device.

13. The system according to claim 12, wherein the image reproduction device is a personal electronic device or is a personal electronic device that is a tablet PC.

14. The system according to claim 12, wherein the image reproduction device is formed by a stationary display.

15. An aircraft comprising:
   a passenger cabin comprising a multiplicity of rows of passenger seats arranged one behind another in relation to a cabin longitudinal direction; and
   a system for surveillance of the passenger cabin of the aircraft, the system comprising:
      a service channel, which is positioned above the rows of passenger seats, extends in the cabin longitudinal direction, and comprises a longitudinal cutout that extends in the cabin longitudinal direction;
      at least one camera module comprising:
         a covering device comprising:
            a carrier part having a circular securing cutout; and
            a mounting structure at least partly surrounding the securing cutout;
         a camera device comprising:
            a camera housing comprising:
               a mounting portion with a spherically curved outer surface; and
               a front cutout;
               wherein the camera housing is mounted by the mounting portion within the mounting structure for rotation or pivoting about at least two axes; and
            a camera unit comprising:
               a lens accommodated in the front cutout of the camera housing;
               an optical sensor located in an interior of the camera housing, wherein the optical sensor is configured for generating image data; and
               a data interface for transferring the image data; and
         a locking device, which is configured for locking the camera housing relative to the mounting structure;
         wherein the carrier part is secured in the longitudinal cutout of the service channel; and
      an image reproduction device, which is connected to the data interface of the camera device via a data network and is configured for reproducing image data provided to the image reproduction device by the camera device.

16. The aircraft according to claim 15, comprising a flight attendant seat in the passenger cabin and, opposite the flight attendant seat, a cabin monument, to which the image reproduction device is fitted, or is fitted in a releasable manner.

17. The aircraft according to claim 16, wherein the cabin monument is an on-board galley, an on-board toilet, or a partition.

18. The camera module according to claim 8, wherein the state of the one or more cabin components comprises a pivoting position of a tray table on a passenger seat, a closing state of a seat belt, and/or an occupancy state of a passenger seat.

19. The camera module according to claim 1, wherein the camera device comprises an illuminant on a front portion of the camera housing, together with the lens in the front cutout of the camera housing.

20. The system according to claim 12, wherein the image reproduction device is formed by a stationary display fitted to an on-board monument and/or to a flight attendant panel.

* * * * *